(12) United States Patent
Han et al.

(10) Patent No.: US 10,102,409 B2
(45) Date of Patent: Oct. 16, 2018

(54) PERSONAL MOBILE TERMINAL DEVICE WITH FINGERPRINT IDENTIFICATION FUNCTION

(71) Applicant: BOE Technology Group Co., Ltd., Beijing (CN)

(72) Inventors: Yanling Han, Beijing (CN); Jiayang Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 577 days.

(21) Appl. No.: 14/768,829

(22) PCT Filed: Sep. 24, 2014

(86) PCT No.: PCT/CN2014/087242
§ 371 (c)(1),
(2) Date: Aug. 19, 2015

(87) PCT Pub. No.: WO2015/192522
PCT Pub. Date: Dec. 23, 2015

(65) Prior Publication Data
US 2016/0253540 A1    Sep. 1, 2016

(30) Foreign Application Priority Data

Jun. 18, 2014 (CN) .......................... 2014 1 0272754

(51) Int. Cl.
G06K 9/00 (2006.01)
H04M 1/02 (2006.01)
H04M 1/67 (2006.01)

(52) U.S. Cl.
CPC ............. *G06K 9/0002* (2013.01); *G06K 9/00* (2013.01); *H04M 1/026* (2013.01); *H04M 1/67* (2013.01)

(58) Field of Classification Search
CPC ....... G06K 9/0002; G06K 9/00; H04M 1/026; H04M 1/67
See application file for complete search history.

(56) References Cited

U.S. PATENT DOCUMENTS 8,564,314 B2 * 10/2013 Shaikh ................. G06K 9/0002
324/658
9,501,685 B2 * 11/2016 Bernstein ............. G06K 9/0002
(Continued)

FOREIGN PATENT DOCUMENTS

CN       201955706 U      8/2011
CN       102739849 A     10/2012
(Continued)

OTHER PUBLICATIONS

First Office Action for Chinese Patent Application No. 201410272754.2, dated Sep. 2, 2015, 9 pages.
(Continued)

*Primary Examiner* — Manav Seth
(74) *Attorney, Agent, or Firm* — Westman, Champlin & Koehler, P.A.

(57) ABSTRACT

Embodiments of the present invention provide a personal mobile terminal device with fingerprint identification function, comprising: a cover plate layer covering the front face of the personal mobile terminal device, comprising a first region corresponding to a display region and a second region except the first region; a fingerprint identification electrode pattern formed on the back face of a fingerprint identification functional region which is located in the second region of the cover plate layer; and a fingerprint identification chip which is electrically connected with the fingerprint identification electrode pattern. The fingerprint identification electrode pattern is formed on the back face of the cover plate (Continued)

layer, so that the whole panel is integrally formed, simplifying manufacturing process and improving aesthetics.

13 Claims, 7 Drawing Sheets

(56) References Cited

U.S. PATENT DOCUMENTS

| | | | |
|---|---|---|---|
| 9,881,196 B2* | 1/2018 | Bernstein | G06K 9/0002 |
| 2004/0211960 A1 | 10/2004 | Joo et al. | |
| 2013/0181949 A1* | 7/2013 | Setlak | G06F 3/042 |
| | | | 345/175 |
| 2014/0219523 A1* | 8/2014 | Perezselsky | G06K 9/00053 |
| | | | 382/124 |

FOREIGN PATENT DOCUMENTS

| | | |
|---|---|---|
| CN | 102866843 A | 1/2013 |
| CN | 203117990 U | 8/2013 |
| CN | 203261366 U | 10/2013 |
| CN | 103577811 A | 2/2014 |
| CN | 103699881 A | 4/2014 |

OTHER PUBLICATIONS

Second Office Action, including Search Report, for Chinese Patent Application No. 201410272754.2, dated Jan. 25, 2016, 10 pages.

International Search Report and Written Opinion for PCT Application No. PCT/CN2014/087242, dated Mar. 27, 2015, 8 pages.

English translation of Box No. V from the Written Opinion of the International Searching Authority for PCT Application No. PCT/CN2014/087242, 3 pages.

Third Office Action, including Search Report, for Chinese Patent Application No. 201410272754.2, dated Jul. 1, 2016, 10 pages.

\* cited by examiner

PERSONAL MOBILE TERMINAL DEVICE WITH FINGERPRINT IDENTIFICATION FUNCTION

CROSS-REFERENCE TO RELATED APPLICATION

This application is a Section 371 National Stage Application of International Application No. PCT/CN2014/087242, filed 24 Sep. 2014, which claims the benefit of Chinese Patent Application No. 201410272754.2 filed on Jun. 18, 2014 in the State Intellectual Property Office of China, the whole disclosure of which is incorporated herein by reference.

BACKGROUND OF THE INVENTION

Field of the Invention

Embodiments of the present invention relate to the technical filed of personal electronic devices, in particular, to a personal mobile terminal device with fingerprint identification function.

Description of the Related Art

With the development of technology, a variety of personal mobile terminal devices, such as smart phones, tablet PCs, notebook computers, mobile Internet devices (referred to as MID) and the like, have been widely applied. These personal mobile terminal devices have provided more convenient way to obtain information, meanwhile, personal information security issues brought by these devices have become increasingly concerned.

There is a kind of existing smart phone, in which a fingerprint identification module 2' is disposed at the Home key position in the middle portion beneath the display region. An user can place his finger on the Home key to unlock the phone. Also, when an user needs to purchase applications in the App Store, he can also use this way for verification, thereby eliminating the need for cumbersome password inputting work.

In the above smart phone, the fingerprint identification module 2' is designed as an individual Home key, as shown in FIG. 1A. This design requires a separate fabrication of a fingerprint recognition panel, and the integral panel has to be hollowed to place the fingerprint identification panel, which not only increases the procedures but also destroys the integrity of the panel.

Further, in the above smart phone, the fingerprint identification module 2' is formed by forming a fingerprint identification electrode pattern 2 on a fingerprint identification sensor, packaging a semiconductor chip below the fingerprint identification electrode pattern 2 and coating a coating material and a protective layer above the fingerprint identification electrode pattern 2, as shown in FIG. 1B. The semiconductor chip is used to receive signals and process data, the upper coating material is required to shield the color of the semiconductor chip and have a good conductivity, and the protective layer is required to be thin enough in order to meet the requirements of detection distance of the sensor. Such a structure has a high requirement for the producing and packaging processes, resulting in a low yield and a high cost.

SUMMARY OF THE INVENTION

In order to solve the above problems, embodiments of the prevent invention provide a personal mobile terminal device with fingerprint identification function, in which a touch electrode and a fingerprint identification electrode are integrated in one cover plate, so as to simplify the production process and maintain the integrity of the panel.

Embodiments of the present invention provide a personal mobile terminal device with fingerprint identification function, comprising: a cover plate layer covering the front face of the personal mobile terminal device, the cover plate layer comprising a first region corresponding to a display region and a second region except the first region, the second region including a fingerprint identification functional region; a fingerprint identification electrode pattern formed on a back face of the fingerprint identification functional region; and a fingerprint identification chip which is electrically connected with the fingerprint identification electrode pattern.

DETAILED DESCRIPTION OF PREFERRED EMBODIMENTS OF THE INVENTION

Figure 1A:
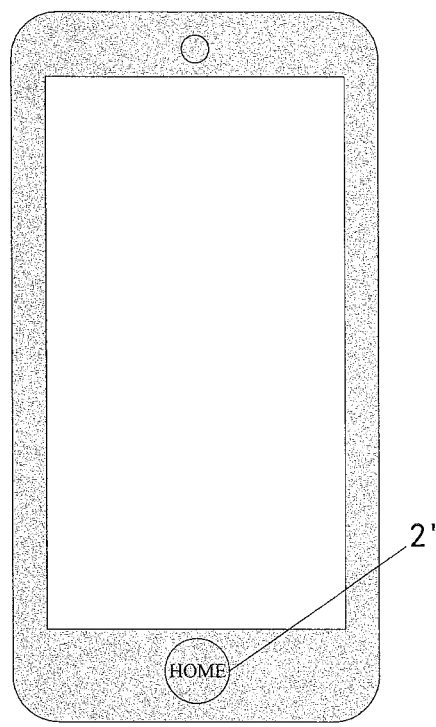
FIG. 1A is a schematic view showing the position of the fingerprint identification system in the existing smart phone.

In order to make objectives, technical solutions and advantages of the embodiments of the invention more clear and apparent, hereinafter, the embodiments of the invention will be described in detail in connection with the specific embodiments and referring to the accompanying drawings. It is noted that the same or similar reference numbers indicate the same or similar parts in the description and drawings. The implementations which are not shown in the drawings or described employ the manners well known by those skilled in the art. In addition, examples including specific values of parameters may be provided herein, however, the parameters may not be precisely equal to the value and may be approximate to the value within the acceptable tolerance. The directional terms described in the embodiments, such as "up", "down", "front", "back", "left", "right" and so on, only refer to the directions in the drawings. Thus, the directional terms are only used to describe the embodiments, rather than to limit the scope of the present invention.

In the personal mobile terminal device with fingerprint identification function according to the embodiments of the present invention, a fingerprint identification electrode pattern (FP Pattern) is formed on a cover plate layer (cover), so that the whole panel is integrally formed, and thus a simplified manufacturing process is achieved, and the integrity of the panel is maintained.

According to an exemplary embodiment of the present invention, a smart phone with fingerprint identification function is provided. The smart phone comprises a LCD portion, a cover plate layer covering the LCD portion and a flexible printed circuit board (FPC) built in the smart phone. The cover plate layer covers the front face of the whole smart phone and is made of transparent material, such as glass, plastic, etc. A touch electrode and a fingerprint identification electrode pattern are formed on the cover plate layer.

Figure 2:
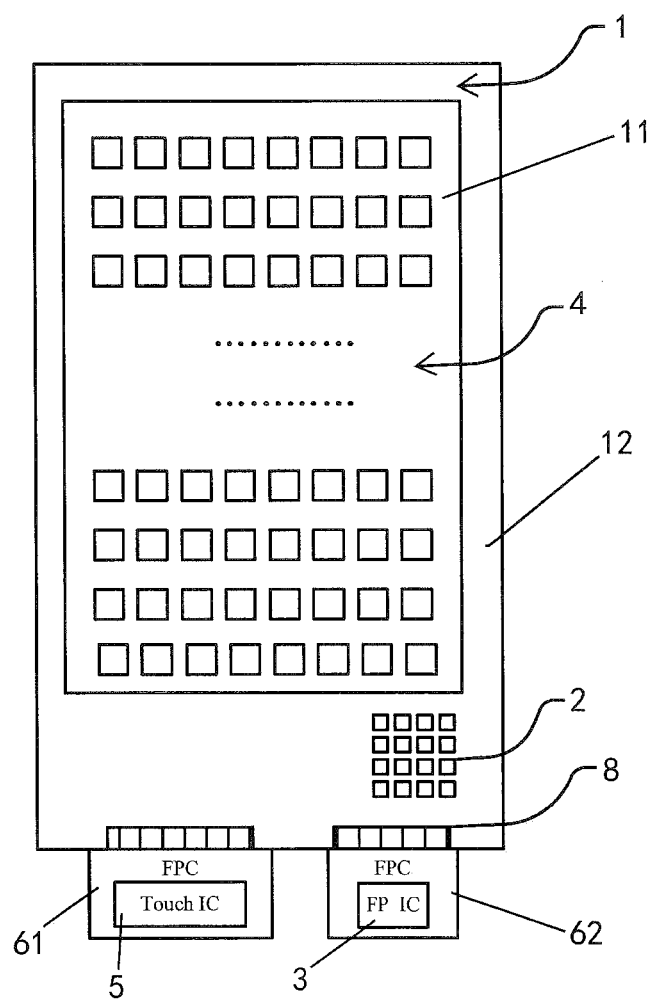
FIG. 2 is a front view of the smart phone with the fingerprint identification function according to a first embodiment of the present invention.

FIG. 2 is a front view of the smart phone with the fingerprint identification function according to a first embodiment of the present invention. As shown in FIG. 2, the smart phone with the fingerprint identification function comprises: a cover plate layer (cover) 1 comprising a first region 11 corresponding to a display region of the smart phone and a second region 12 except the first region 11; a fingerprint identification electrode pattern (FP Pattern) 2 formed on the back face of a fingerprint identification functional region 20 (FIG. 3) which is located in the second region 12 of the cover plate layer (cover) 1; and a fingerprint identification chip (FP IC) 3 which is electrically connected with the fingerprint identification electrode pattern 2.

In the embodiment, the FP Pattern is formed on the back face of the cover plate layer, rather than locating the fingerprint identification module in a hollowed portion in the panel of a smart phone as in the prior art, so that the whole panel is integrally formed which not only simplifies manufacturing process, but also improves aesthetics.

Various components of the smart phone with the fingerprint identification function according to the above embodiment will be explained in detail in the following.

Figure 3:
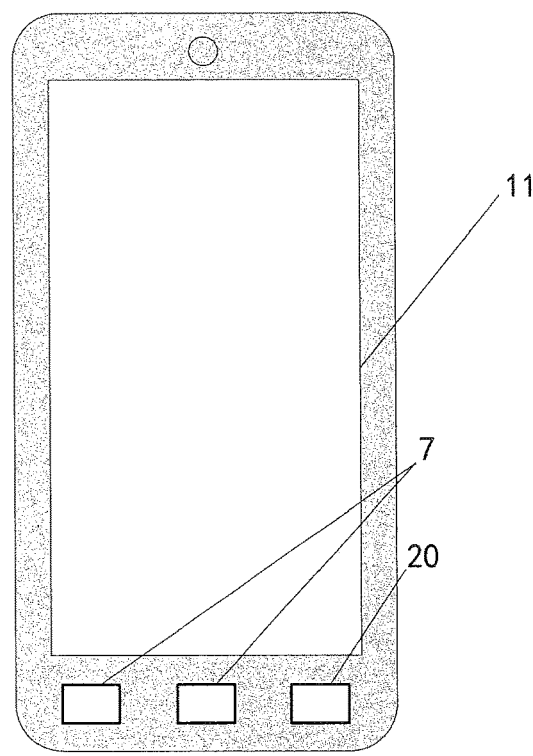
FIG. 3 is a schematic view showing the position of the fingerprint identification electrode pattern in the smart phone shown in FIG. 2.

In the embodiment, as shown in FIG. 3, the fingerprint identification functional region 20 is disposed on the cover plate layer 1 on a lower right side of the display region 11.

The distance between the FP Pattern and the FP IC is shortened by disposing the fingerprint identification functional region at a side of the region below the display region, thereby facilitating wiring and improving anti-interference.

Figure 4:
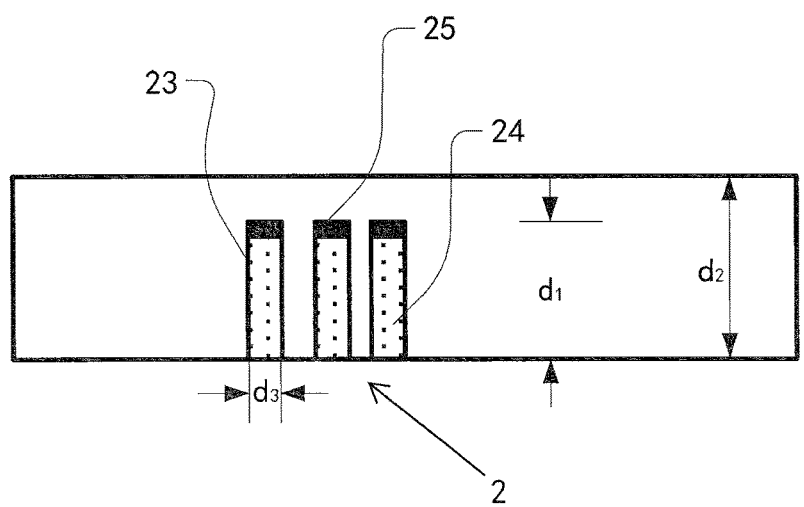
FIG. 4 is a schematic section view of the fingerprint identification electrode of the fingerprint identification electrode pattern in the smart phone shown in FIG. 2.

FIG. 4 is a schematic section view of the electrode of the fingerprint identification electrode pattern in the smart phone shown in FIG. 2. As shown in FIG. 4, a suitable region in the second region 12 is selected as the fingerprint identification functional region 20, and a blind-hole array is produced on the back face of the fingerprint identification functional region 20. The blind-hole array comprises several blind holes 23. The FP Pattern 2 comprises: sensing columns 24, which are filled in the blind holes respectively and each of which is electrically connected to the FP IC 3 (FIG. 2). The sensing column 24 is made of conductive material such as gold, silver, platinum, copper and aluminum or the combination thereof. Alternatively, the sensing column may also be formed by other conductive material such as non-metallic conductive material.

Referring to FIG. 4, the overall thickness d2 of the cover plate layer 1 may be 500 nm and the depth of the blind hole 23 d1 may be 400 nm, as a result, the distance between the top of the sensing column 24 and the front face of the cover plate layer 1 is 100 nm. However, the present invention is not limited thereto. In the embodiment, since the identification distance of the sensing column is short, the distance between the top of the sensing column 24 and the front face of the cover plate layer 1 should be less than 200 nm, preferably in a range of 50 nm to 200 nm, in order to ensure the fingerprint identification accuracy. It shall be appreciated that these parameters may be suitably designed by those skilled in the art according to the specific requirements of various mobile terminals.

In the embodiment, the blind holes 23 have a circular cross section which has a diameter d3 of 100 nm. However, the present invention is not limited thereto. The cross section of the blind holes may also have other shape, such as rectangle, square, ellipse, trapezoid, etc. The lateral width of the blind hole may be in a range of 80 nm to 150 nm.

Meanwhile, in order to prevent the conductive material filled in the blind hole 23 from reflecting light, an anti-reflective substrate 25 is disposed at the bottom of the blind hole 23 and at the top end of the sensing column 24. The substrate 25 may be black or colored.

It should be noted that, since the thickness of the cover plate layer in the embodiment is relatively large, the FP Pattern 2 is produced by drilling holes in the back face of the cover plate layer in order to reduce the vertical distance between the fingerprint and the FP Pattern 2 and thus ensure the fingerprint identification accuracy. In other embodiments of the present invention, in the case that the cover plate layer is thin enough, the FP Pattern may also be printed on the back face of the cover plate layer, or be formed by depositing a film on the back face of the cover plate layer and then etching the deposited film.

In the embodiment, the touch electrode pattern 4 and lead wires therefor are formed in the first region 11 on the back face of the cover plate layer 1. In this case, the first region 11 may also be referred as a touch functional region. The touch functional region is different from the above fingerprint identification functional region.

Figure 5:
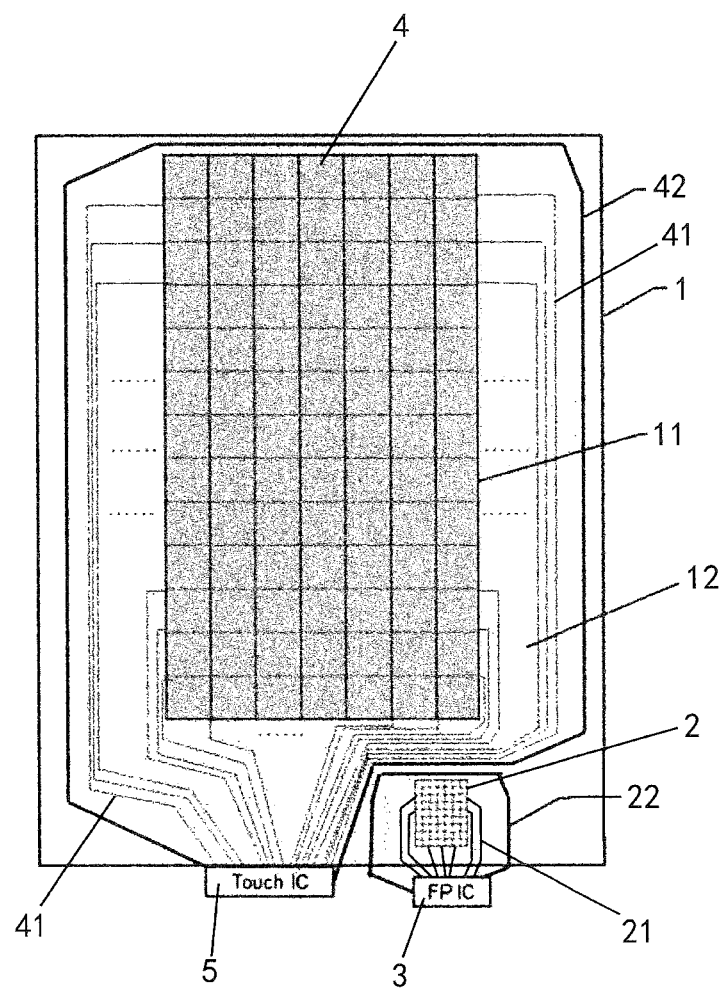
FIG. 5 is a schematic view showing lead wires for the fingerprint identification electrode in the smart phone shown in FIG. 2.

FIG. 5 is a schematic view showing lead wires 21 for the fingerprint identification electrode in the smart phone shown in FIG. 2. As shown in FIG. 5, the region where the FP Pattern 2 and the lead wires 21 therefor are located are separated from the region where the touch electrode pattern 4 and the lead wires 41 therefor are located, and the lead wires 21 for the FP Pattern 2 do not intersect with the lead wires 41 for the touch electrode pattern 4.

Meanwhile, a grounding ring 22 is disposed around the region where the FP Pattern 2 and the lead wires 21 therefor are located, and another grounding ring 42 is disposed around the region where the touch electrode pattern 4 and the lead wires 41 therefor are located. The two grounding rings are separated from each other to reduce mutual interference therebetween. Obviously, it is practicable that only a grounding ring is disposed around one of the two regions.

In the embodiment, the FP Pattern 2 and the Touch Pattern 4 are produced at the same time, no additional mask is required, thereby simplifying the production process, saving the cost and increasing the qualified rate.

Referring to FIG. 2, the FP Pattern 2 and the Touch Pattern 4 are both connected to a terminal pad region 8 through lead wires, then connected to the FP IC 3 and a touch chip (Touch IC) 5 on FPCs 61, 62, respectively.

In the embodiment, the terminal pad region corresponding to the FP Pattern 2 and the terminal pad region corresponding to the Touch Pattern 4 are disposed separately, and a flexible printed circuit board 62 on which the FP IC 3 is located and a flexible printed circuit board 61 on which the Touch IC 5 is located are disposed separately.

Compared with the existing configuration in which the FP Pattern is separately produced and the semiconductor chip is packaged below the FP Pattern for data processing, in the embodiment of the present invention, the FP IC 3 and the Touch IC 5 are provided separately, thus the FP IC can be selected as required, increasing flexibility of design and facilitating debugging and extending the functions.

In addition, except the cover plate layer, some smart phones may also be provide with a covering film below the cover plate layer. In this case, the Touch Pattern may be produced on the covering film. It will not affect the implementation of the present invention and will not be described further herein.

Figure 6:
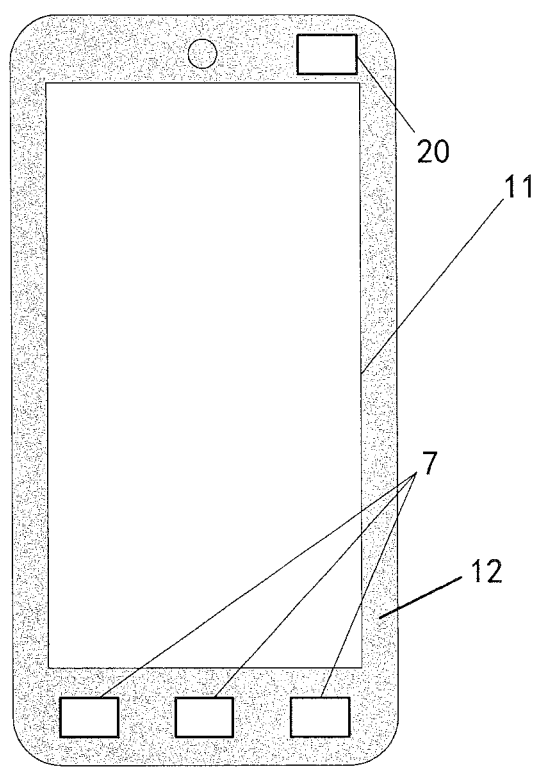
FIG. 6 is a front view of the smart phone with the fingerprint identification function according to a second embodiment of the present invention.

FIG. 6 shows the smart phone with the fingerprint identification function according to a second embodiment of the present invention. Referring to FIG. 6, the smart phone differs from the smart phone according to the first embodiment in that: the FP Pattern 20 is located on an upper right side of the display region (i.e. the first region) 11. Other normal operating keys 7 located below the display region are same as those of most of the existing Android smart phones.

In the embodiment, the fingerprint identification region 20 and the display region 11 are disposed at upper side and lower side of the cover plate layer 1 respectively, so that wiring space is expanded, achieving a high degree of freedom for wiring design.

Those skilled in the art will appreciate that the fingerprint identification region may be located in other positions besides the positions on the lower right side or the upper right side of the display region. For example, a position right above the display region, a position right below the display region, a position on a upper left side of the display region, or a position on the lower left side of the display region, and so on. The present invention is not limited thereto.

Figure 7:
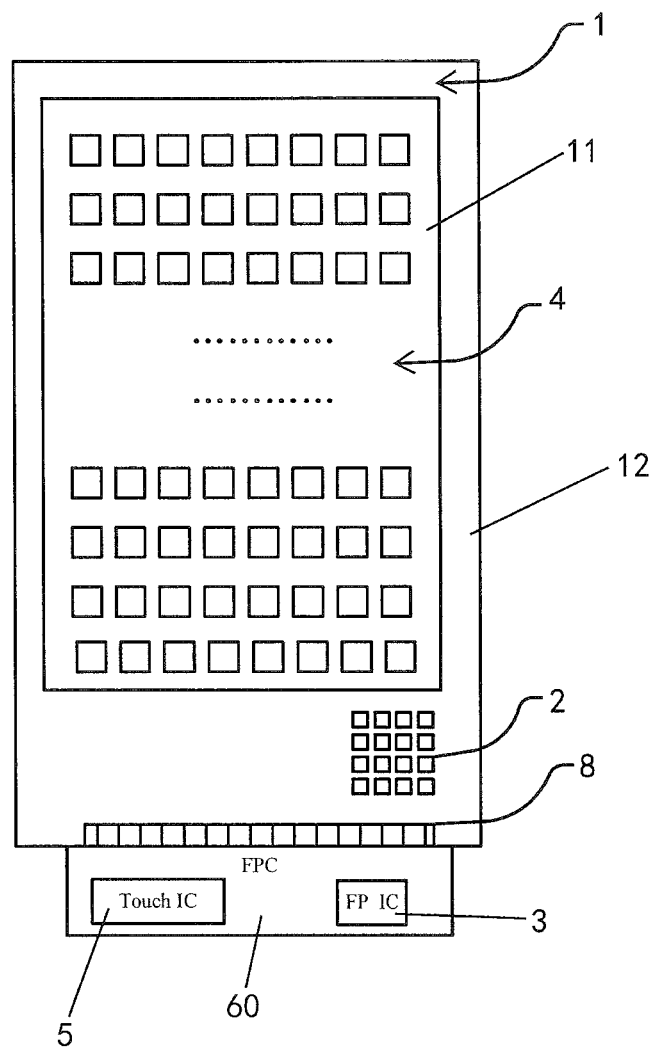
FIG. 7 is a schematic view of the smart phone with the fingerprint identification function according to a third embodiment of the present invention, which has a common region including a PAD region and a FPC region.

FIG. 7 shows the smart phone with the fingerprint identification function according to a third embodiment of the present invention. The smart phone differs from the smart phone according to the first embodiment in that: the terminal pad region 8 corresponding to the FP Pattern 2 and the welding region 8 corresponding to the Touch Pattern 4 are combined into one. Also, the FP IC 3 and the Touch IC 5 are disposed on one FPC 60. In other words, as shown in FIG. 7, the fingerprint identification function and the touch function share the same terminal pad region 8 and the same FPC 60.

Figure 8:
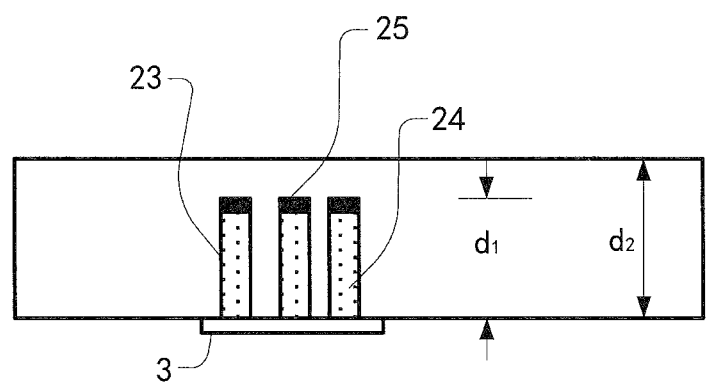
FIG. 8 is a schematic view of the smart phone with the fingerprint identification function according to a fourth embodiment of the present invention, in which the fingerprint identification chip is fixed below the fingerprint identification electrode pattern with COG process.

FIG. 8 shows the smart phone with the fingerprint identification function according to a fourth embodiment of the present invention. The smart phone differs from the smart phone according to the first embodiment in that: the FP IC 3 is directly bonded on the back face of the cover plate layer 1, rather than being disposed on the FPC, by using the COG (chip on glass) process. In this case, pins of the FP IC 3 are connected to the FP Pattern 2 through lead wires.

Figure 1B:
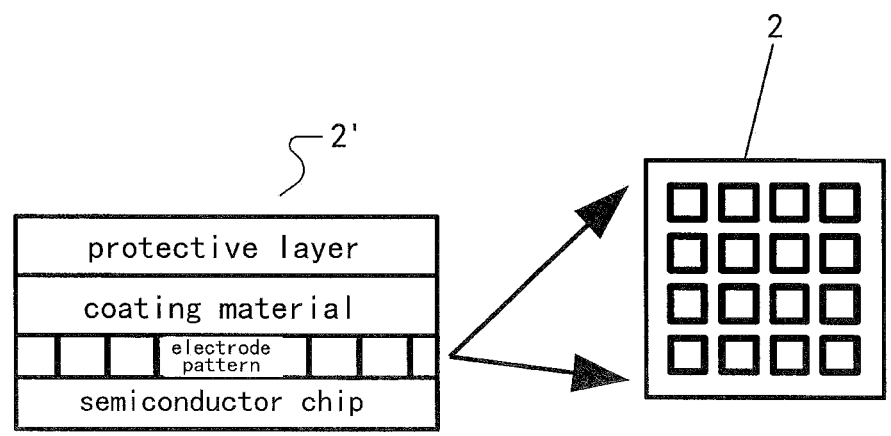
FIG. 1B is a vertical section view of the fingerprint identification module of the smart phone shown in FIG. 1A.

It should be noted that, in the smart phone shown in FIGS. 1A and 1B, each of pins of the FP IC is connected to the corresponding portion of the FP Pattern directly without lead wires. In the present embodiment, each of pins of the FP IC 3 is connected to the corresponding portion of the FP Pattern 2 through lead wires, thereby achieving a high flexibility for designing the FP IC and facilitating debugging and maintaining.

In other embodiments of the present invention, the personal mobile terminal devices may be tablet PCs, notebook computers, mobile Internet devices and so on, in which the arrangements of the cover plate layer, the FP Pattern and the FP IC are same as those in the above embodiments, they will not be described further here.

The personal mobile terminal device with fingerprint identification function according to the embodiments of the present invention has the following effects: (1) the FP Pattern is formed on the back face of the cover plate layer, so that the whole panel is integrally formed, simplifying manufacturing process and improving aesthetics; (2) the FP Pattern is formed on the cover plate layer without any additional mask, saving the production cost; (3) the FP Pattern is connected to the FP IC through lead wires, so that the FP IC can be selected freely, thereby increasing design flexibility and facilitating debugging and extending the functions.

Several embodiments of the present invention are described in detail as above in connection with the drawings. The above descriptions are intended to aid in understanding the personal mobile terminal device with fingerprint identification function according to the inventive concept of the present invention, but not to limit the present invention. Any modifications, equivalents, improvements made within the spirit and principle of the present invention should be included within the scope of the present invention.

What is claimed is:

1. A personal mobile terminal device with a fingerprint identification function, comprising:
   a cover plate layer, covering a front face of the personal mobile terminal device, and comprising a first region corresponding to a display region and a second region except the first region, the second region including a fingerprint identification functional region;
   a fingerprint identification electrode pattern formed on a back face of the fingerprint identification functional region;
   a fingerprint identification chip which is electrically connected with the fingerprint identification electrode pattern;
   a touch electrode pattern formed on a back face of a touch functional region of the cover plate layer which is located within the first region of the cover plate layer;
   a touch chip which is electronically connected with the touch electrode pattern; and
   terminal pad regions;
   wherein the fingerprint identification electrode pattern and the touch electrode pattern are connected to the terminal pad regions through lead wires and then connected to the fingerprint identification chip and the touch chip, respectively.

2. The personal mobile terminal device of claim 1, wherein the fingerprint identification functional region is located on a lower right side or an upper right side of the display region.

3. The personal mobile terminal device of claim 1, wherein the fingerprint identification electrode pattern is formed by a printing process or by film deposition and etching processes.

4. The personal mobile terminal device of claim 1, wherein there is a blind hole array consisting of a plurality of blind holes on the back face of the fingerprint identification functional region, and the fingerprint identification electrode pattern comprises sensing columns made of conductive material, which are filled in the respective blind holes respectively and each of which is electrically connected to the fingerprint identification chip through a lead wire.

5. The personal mobile terminal device of claim 4, wherein a distance between a bottom of the blind hole and the front face of the cover plate layer is in a range of 50 nm to 200 nm.

6. The personal mobile terminal device of claim 4, wherein the blind hole has a circular cross section with a diameter of 80 nm to 150 nm.

7. The personal mobile terminal device of claim 4, wherein an anti-reflective substrate is disposed at the bottom of the blind hole and at the top end of the sensing column.

8. The personal mobile terminal device of claim 4, wherein the material of the sensing column comprises one or more of gold, silver, platinum, copper and aluminum.

9. The personal mobile terminal device of claim 1, wherein, the region where the fingerprint identification electrode pattern and the lead wires therefor are located are separated from the region where the touch electrode pattern and the lead wires therefor are located, so that the lead wires for the fingerprint identification electrode pattern do not intersect with the lead wires for the touch electrode pattern.

10. The personal mobile terminal device of claim 9, wherein, a grounding ring is disposed around the region where the fingerprint identification electrode pattern and the lead wires therefor are located, and/or another grounding ring is disposed around the region where the touch electrode pattern and the lead wires therefor are located, the two grounding rings being separated from each other.

11. The personal mobile terminal device of claim 1, wherein, wherein,
   the terminal pad region corresponding to the fingerprint identification electrode pattern and the terminal pad region corresponding to the touch electrode pattern are disposed separately or integrally; and
   a flexible printed circuit board on which the fingerprint identification chip is located and a flexible printed circuit board on which the touch chip is located are disposed separately, or the fingerprint identification chip and the touch chip are located on the same flexible printed circuit board.

12. The personal mobile terminal device of claim 1, wherein the fingerprint identification chip is bonded onto the back face of the fingerprint identification functional region of the cover plate layer, respective pins of the fingerprint identification chip being connected to the fingerprint identification electrode pattern through lead wires.

13. The personal mobile terminal device of claim 1, wherein the cover plate layer is made of transparent material.

* * * * *